(12) United States Patent
Mulcaire

(10) Patent No.: US 8,714,478 B2
(45) Date of Patent: May 6, 2014

(54) ASSEMBLY COMPRISING A GAS TURBINE ENGINE AND A SUPPORTING PYLON

(75) Inventor: Thomas G Mulcaire, Derby (GB)

(73) Assignee: Rolls-Royce PLC, London (GB)

( * ) Notice: Subject to any disclaimer, the term of this patent is extended or adjusted under 35 U.S.C. 154(b) by 587 days.

(21) Appl. No.: 13/159,565

(22) Filed: Jun. 14, 2011

(65) Prior Publication Data

US 2011/0315814 A1  Dec. 29, 2011

(30) Foreign Application Priority Data

Jun. 25, 2010 (GB) .................................... 1010665.6

(51) Int. Cl.
*B64D 27/26* (2006.01)
(52) U.S. Cl.
USPC ............................................. 244/54; 60/797
(58) Field of Classification Search
USPC ................... 244/54, 55, 56; 248/554; 60/797
See application file for complete search history.

(56) References Cited

U.S. PATENT DOCUMENTS

| | | | | |
|---|---|---|---|---|
| 3,042,349 A * | 7/1962 | Pirtle et al. | ..................... | 248/554 |
| 3,222,017 A * | 12/1965 | Bobo | ............................. | 248/557 |
| 5,065,959 A * | 11/1991 | Bhatia et al. | ..................... | 244/54 |
| 5,474,258 A * | 12/1995 | Taylor et al. | ..................... | 244/54 |
| 8,118,251 B2 * | 2/2012 | Suciu et al. | ..................... | 244/54 |
| 2008/0067287 A1* | 3/2008 | Guibert et al. | .................. | 244/54 |

FOREIGN PATENT DOCUMENTS

EP  1 921 007 A2  5/2008

OTHER PUBLICATIONS

Search Report issued in British Application No. GB1010665.6 dated Aug. 11, 2010.

* cited by examiner

*Primary Examiner* — Rob Swiatek
(74) *Attorney, Agent, or Firm* — Oliff PLC

(57) ABSTRACT

A gas turbine engine is supported on an aircraft fuselage by a pylon which carries a mounting ring. The mounting ring is releasably coupled to an engine ring on the casing of the engine, centered on the engine axis. A further member extends from the pylon and is secured to a location on the engine which is axially spaced from the mounting ring. The arrangement enables the engine to be on the pylon in different orientations, to suit different mounting configurations on the aircraft.

8 Claims, 3 Drawing Sheets

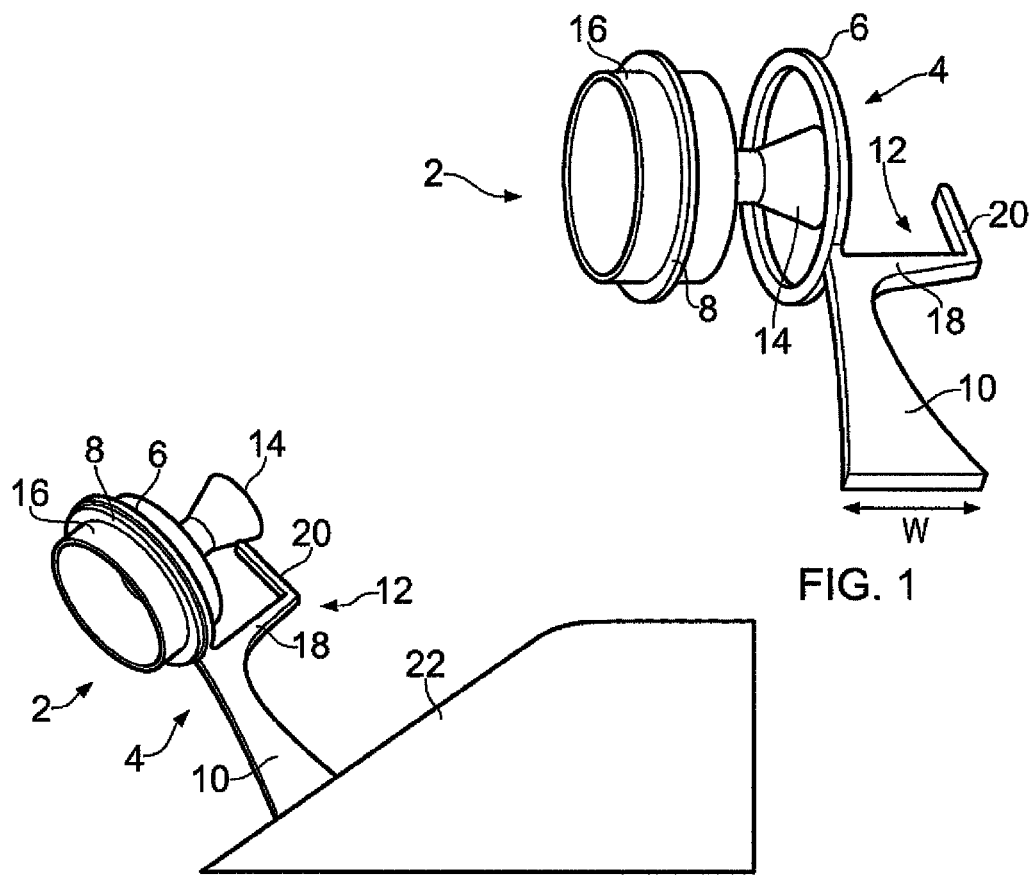
FIG. 1
FIG. 2
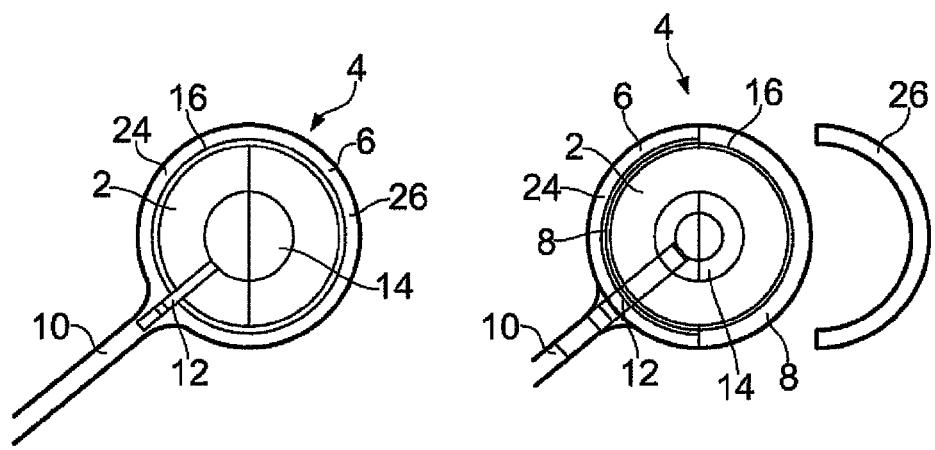
FIG. 3
FIG. 4

ASSEMBLY COMPRISING A GAS TURBINE ENGINE AND A SUPPORTING PYLON

This invention relates to an assembly comprising a gas turbine engine and a supporting pylon.

Where a gas turbine is used to propel an aircraft, it is necessary to mount the engine to the aircraft so that the loads acting on the engine are transferred to the aircraft.

GB2375513 describes a mounting arrangement for suspending an engine beneath an aircraft pylon. The engine has mountings at a forward mounting location and a rearward mounting location aligned with each other with respect to the engine axis. The mountings are arranged above the engine axis so that the engine hangs immediately beneath the pylon. The arrangement enables the same mounting locations on the engine to be used irrespective of the side of the aircraft to which the engine is mounted while allowing the engine to assume the same orientation about its axis.

In some instances it is desirable for the engine to be connected to its supporting pylon at mounting locations which are not positioned in the vertical plane of the engine. An example is where an aircraft has fuselage mounted engines in which case each engine is positioned laterally with respect to the length of the fuselage. Each engine is therefore provided with two sets of mounting locations, one on each side, in order to facilitate mounting on either side of the aircraft.

In the case of a turbofan engine in which the engine is supported at its core, the supporting structure associated with each mounting location must extend across the internal bypass duct provided between the engine core and the fan or the outer casing.

The supporting structure is provided with a fairing to improve the flow characteristics within the duct, in particular, to reduce impact of the obstruction on the pressure distribution downstream of the fan. The fairings may further be used to house cabling and other control linkages crossing the duct. Nevertheless, the disruption of the flow in the duct by the fairings will generally have a detrimental effect on the performance of the engine, particularly when the support structures are situated in proximity to the fan.

Where a second set of mounting locations is provided, the associated support structure has further adverse effects on the flow characteristics within the duct. These adverse effects are particularly detrimental when the support structures are inclined to the horizontal which requires the support structures to be inclined to each other within the duct. This asymmetric configuration within the duct can lead to a non-uniform flow field downstream of the fan which can give rise to flutter and vibration problems with the fan blades.

In addition, configurations such as that presented in GB2375513 transmit loads acting on the engine through the mounting locations which are disposed on only one side of the engine. This causes asymmetric loading of the engine which can result in engine bending.

According to the present invention there is provided an assembly comprising a gas turbine engine and a supporting pylon which carries the engine at one end of the pylon, the engine being provided with an annular structure centred on the engine axis, the annular structure being provided with pylon interface means for connection to the pylon, the pylon interface means being disposed to enable connection of the pylon to the annular structure at any one of a plurality of angular orientations of the engine relative to the pylon about the engine axis.

The pylon may be provided at its said one end with a mounting ring which is coaxial with and releasably coupled to the annular structure.

The annular structure may comprise an engine ring projecting radially of a casing of the engine.

A further member may be secured to the engine at a location which is axially spaced from the mounting ring. The further member may extend from the pylon and may, for example, be an angled strut.

The gas turbine engine may be a turbofan engine, in which case the annular structure may be on the fan and the further member, if present, may be secured to a core of the engine.

The mounting ring may be coupled to the annular formation by an axial connecting means for transferring axial forces between the engine and the mounting ring. The axial connecting means may comprise axial bolts, a bayonet structure or a clamping band having a V-shaped cross section.

A torque transfer means may be provided between the mounting ring and the annular formation and may comprise axial or radial pins which are a close fit in bores provided in the mounting ring and the annular structure.

The pylon may be connected at its other end to an aircraft fuselage, and the engine may be one of two engines supported on opposite sides of the fuselage by respective mounting arrangements.

For a better understanding of the present invention, and to show more clearly how it may be carried into effect, reference will now be made, by way of example, to the accompanying drawings, in which:—

FIG. 1 shows a diagrammatic exploded view of a gas turbine engine and a mounting arrangement;

FIG. 2 shows the engine of FIG. 1 supported on an aircraft fuselage connected by the mounting arrangement;

FIG. 3 is a rear view of the engine shown in FIG. 2;

Figure 5:
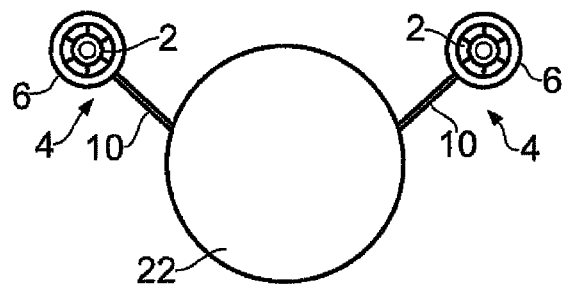
Figure 6:
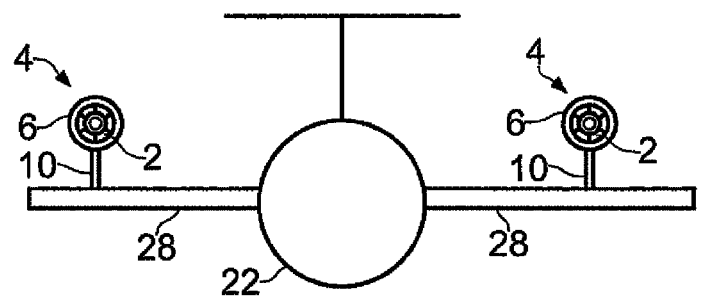
Figure 7:
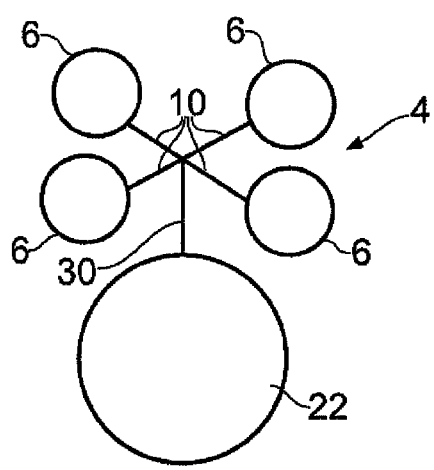
Figure 8:
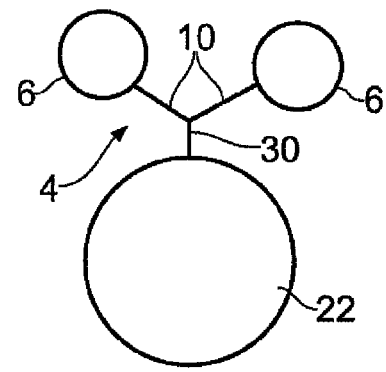
Figure 9:
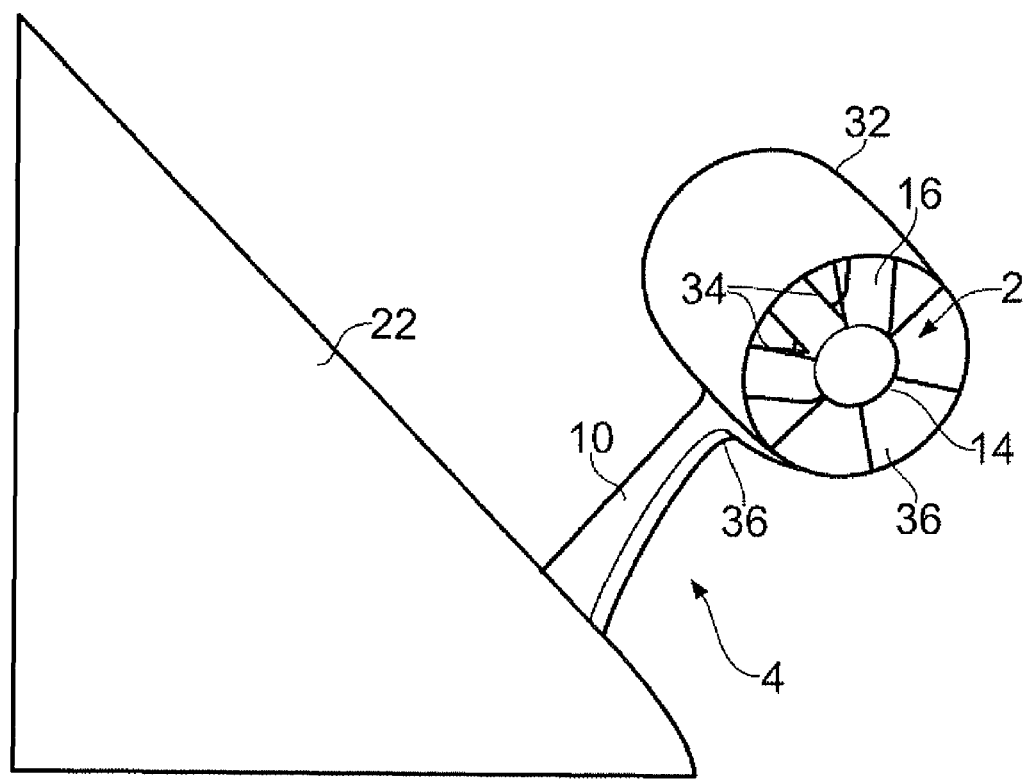

FIG. 4 corresponds to FIG. 3 but shows an alternative construction;

FIG. 5 is a diagrammatic front view of an aircraft fuselage having two fuselage mounted engines;

FIG. 6 is a diagrammatic front view of an aircraft having two wing mounted engines;

FIGS. 7 and 8 correspond to FIG. 5 but show further mounting configurations; and FIG. 9 shows a mixed jet engine configuration.

FIG. 2 shows a turbofan engine 2 supported by a mounting arrangement 4 on a further structure which, in this embodiment, is an aircraft fuselage 22. FIG. 1 shows the engine 2 separated from the mounting arrangement 4.

The turbofan engine 2 comprises an engine core 14 and a fan casing 16. An annular structure in the form of an engine ring 8 projects outwardly of the fan casing 16 and is coaxial with the engine axis. The engine ring 8 may form an integral part of the fan casing 16, or it may be a separate component secured in a suitable manner to the fan casing 16.

The mounting arrangement 4 comprises a mounting ring 6, a pylon 10 and a further member in the form of an angled strut 12. The mounting ring 6 has an internal diameter which corresponds to the outer diameter of the fan casing 16. The pylon 10 is secured at one end to the mounting ring 6 and extends radially outwardly from the mounting ring 6 to an opposite end at which it is secured to the aircraft fuselage 22. The pylon 10 has a width W in a direction parallel to the engine axis. The width W of the pylon 10 increases over the length of the pylon 10 from the end attached to the mounting ring 6 to the end secured to the aircraft fuselage 22.

The engine 2 and the mounting arrangement 4 are assembled by positioning the engine 2 within the mounting ring 6 such that the engine ring 8 is aligned with the mounting ring 6. A rear face of the engine ring 8 is brought into contact with a forward face of the mounting ring 6. The mounting ring 6 thus restricts further axial displacement of the engine ring 8, and thus of the engine 2, in a rearward direction with respect to the engine axis. Loads acting on the engine 2 are distributed about the entire circumferential extents of the engine and mounting rings 8, 6. As shown in FIGS. 1 and 2, the engine 2 is installed with the engine ring 8 ahead of the mounting ring 6. However, the reverse arrangement is possible, with the engine ring 8 to the rear of the mounting ring 6.

The engine ring 8 is provided with interface means for securing the engine ring 8 to the mounting ring 6 in a manner which enables the loads generated by the engine to be transferred to the pylon 10 and thence to the fuselage 22. In one embodiment, axial pins (not shown) may be provided to transmit torque and radial loads. Such axial pins would not transmit axial loads. The interface means may comprise bores in the engine ring 8, and the pins may be a close fit in these bores and in corresponding bores in the mounting ring 6 so as to be loaded in shear. As an alternative, the pins may extend radially between surfaces of the rings 6, 8 which nest radially one within the other.

The interface means may comprise a circumferential array of holes in the engine ring 8 which receive bolts (not shown) for transferring axial loads, such as engine thrust, between the rings 6, 8. Such axial loads may be forward or rearward. The bolts also pass through respective holes in the mounting ring 6.

The holes and the bores for the bolts and the axial or radial pins are disposed in circumferential arrays around the rings 6, 8 to enable the engine 2 to be supported in the mounting ring 6 in several orientations about the engine axis. Consequently, regardless of the inclination of the pylon 10 with respect to the horizontal, the engine 2 can always be positioned so that, in level flight, it is oriented in the desired manner, for example with the engine accessory gearbox (not shown) situated at or close to bottom dead centre.

For example, the angular pitch of the respective holes and bores constituting the interface means of the engine ring 8 may be not more than 90°, or may be not more than 45°. In one embodiment, the angular pitch is 30°.

Any suitable alternative securing arrangement may be used, provided that it is capable of withstanding the torque and the radial and axial loads that must be transferred between the rings 6, 8 and provided that the securing arrangement enables the engine 2 to be secured to the mounting ring 6 in any one of a plurality of angular positions.

For example torque loads could be transferred by complementary formations, such as castellations possibly in the form of a Curvic® coupling.

Instead of the bolted connection referred to above, a bayonet style of connection may be used to transfer axial loads, using interlocking castellated features on the rings 6, 8 in conjunction with axial or radial close fitting pins to transfer torque. Thus, the castellated features on the engine ring 8 would serve as a bayonet formation constituting at least part of the interface means. As with the bolted connection referred to above, the bayonet connection would be capable of permitting installation of the engine 2 at any one of a plurality of angular positions.

As another alternative to the bolts, a spherical bearing arrangement could be used.

The mounting ring 6 may be configured to provide a lock, for example at bottom dead centre, to ensure that the engine 2 is always correctly oriented.

A first section 18 of the angled strut 12 projects from the pylon 10 in a rearward direction with respect to the engine 2. A second section 20 of the angled strut 12 extends from the rearward end of the first section 18 towards the engine axis. The radially inner end of the second section 20 is secured to a rearward portion of the core 14 of the engine 2. Loads generated by the engine 2 are transmitted through the angled strut 12 and the pylon 10 to the aircraft fuselage 22. The angled strut 12 supports the engine 2 against radial loads and so, in conjunction with the mounting ring 6, maintains the alignment of the engine axis. Thus in the present embodiment, the radial loads acting on the engine 2 are shared between the mounting ring 6 and the angled strut 12.

The core 14 of the engine 2 may be provided with two mounting locations for the angled strut 12, angularly offset with respect to one another about the engine axis, in order to facilitate mounting of the engine 2 on either side of the fuselage 22.

Alternatively, the torque from the engine 2 can be reacted through the second section 20, so that thrust reaction and radial location are provided by the mounting ring 6 and radial and torque reaction are provided by the second section 20.

With the mounting arrangement 4 as shown in FIGS. 1 to 4, the engine thrust is transferred around the engine ring to the mounting ring instead of via thrust links from the core to a rear mounting, as in known engine mountings. This minimises any engine bending, as thrust is distributed evenly around the engine circumference. Also, the absence of any thrust links, and the associated aerodynamic fairings, located within the bypass duct alleviates the requirement for outlet guide vanes to be adapted to divert the airflow around downstream fairings. While splitter fairings may be required to transfer services, these can be smaller than those used in known engine mountings. As the arrangement shown in FIGS. 1 to 4 facilitates mounting the engine in one orientation either side of the aircraft fuselage, one splitter can be used either above or below the engine to transfer services. Consequently, a much improved pressure field may be achieved downstream of the fan rotor, improving the flutter and vibration capability of the blades and so possibly leading to a life increase, reduction in engine operating restrictions (keep-out zones), weight reduction and a performance improvement in general due to the "cleaner" by-pass duct. Possibly the external gearbox could be mounted on the engine core 4 to remove the blockage due to the radial drive shaft passing through the by-pass duct downstream of the outlet guide vanes and further improving efficiency and reducing weight.

In the present embodiment the mounting arrangement 4 is formed as a single structure. Alternatively, individual mounting ring 6, pylon 10 and angled strut 12 components may be assembled to form the mounting arrangement 4.

The engines shown in FIGS. 1 to 3 may be further provided with a nacelle or other fairing covering the core 14, fan casing 16 and at least part of the mounting assembly 4.

It will be appreciated that the configuration shown in FIGS. 1 and 2 are examples only of how the invention may be put into effect. Further embodiments are described below.

The engine ring 8 and the mounting ring 6 may be clamped together by a circumferential band or strap arrangement disposed radially outwardly or radially inwardly of the rings 6, 8. The strap engages with complementary faces of the mounting ring 6 and the engine ring 8 so that, when tightened, the strap secures the rings 6, 8 together. For example, a strap having an internal channel of, for example, V-shaped cross section could surround the radially outer peripheries of the rings and clamp the rings 6, 8 together within the "V".

in an alternative embodiment, shown in FIG. 4, the mounting ring 6 is a split-ring comprising a first semi-circular section 24 connected to the pylon 10 and a second semi-circular section 26. The sections 24, 26 are provided with respective circumferential grooves about their radially inner surfaces. The grooves have a profile which corresponds to the outer profile of the engine ring 8. For example, the grooves and the outer profile of the engine ring 8 may have a complementary V-shaped profile. The semi-circular sections are secured together about the engine ring 8 thereby clamping the mounting ring 6 to the engine ring 8.

FIG. 5 shows an aircraft fuselage having two engines 2 mounted on the aircraft fuselage 22 by pylons 10 which are inclined upwardly from the horizontal. The engines 2 can be identical to each other, but secured to the mounting rings 6 in the same orientation as each other with respect to the vertical.

FIG. 6 shows an aircraft having two engines 2 mounted above wings 28.

FIG. 7 shows a mounting arrangement 4 for a plurality of engines carried on pylons 10 which are branched from a single main pylon 30.

FIG. 8 shows a mounting arrangement 4 in which two engines 2 are carried on pylons 10 which are branched from a single main pylon 30.

In FIGS. 1 and 2 the turbofan engine 2 is supported by the mounting ring 6 at the fan 16 and by the angled strut 12 at the core engine 14. In an alternative embodiment, the core engine 14 may be supported by a mounting ring 6 and the fan may be supported by the angled strut 12.

In the embodiment of FIGS. 1 to 4, the engine 2 is in a separate jet configuration. As shown in FIG. 9, the mounting arrangement 4 can also be employed with an engine 2 in a mixed jet configuration. A structural casing 32 encloses both the fan 16 and the core engine 14. The casing 32 supports the engine 2 by way of struts 34 which may be used to transfer services between the casing 32 and the engine 2.

The pylon 10 is secured to the casing 32 at an interface location 36 by suitable interface means. The interface means is also provided at least one other interface location 36, to enable the engine to be oriented with respect to the pylon 10 to suit mounting of the engine 2 on the other side of the aircraft fuselage 22.

It will be appreciated that the invention may be used in conjunction with turbojet, turbofan, turboprop and similar axial flow or radial flow engines. The fan 16 may be at the front of the engine 2 as shown in FIGS. 1 to 4, or at the rear, to serve as a "pusher".

The invention may also be used in conjunction with servicing vehicles and devices for the transport, maintenance or manufacture of an axial flow or radial flow engines.

The invention claimed is:

1. An assembly comprising:
   a gas turbine engine; and
   a supporting pylon which carries the engine at one end of the pylon, wherein:
   the engine is provided with an annular structure centred on the engine axis,
   the pylon is provided at the one end with a mounting ring which is coaxial with and releasably coupled to the annular structure, and
   the pylon is connectable to the annular structure at any one of a plurality of angular orientations of the engine relative to the pylon about the engine axis.

2. An assembly as claimed in claim 1, in which the pylon is provided with a further member which is secured to the engine at a location which is axially spaced from the mounting ring.

3. An assembly as claimed in claim 2, wherein the gas turbine engine is a turbofan and in which the mounting ring and the further member are secured respectively to a fan and a core of the engine.

4. An assembly as claimed in claim 1, in which the annular structure comprises an engine ring extending radially of a casing of the engine.

5. An assembly as claimed in claim 1, wherein the gas turbine engine is a turbofan.

6. An assembly as claimed in claim 1, in which the annular structure is a structural casing within which the engine is mounted.

7. An assembly as claimed in claim 1, in which the pylon is secured at its other end to an aircraft fuselage.

8. An assembly as claimed in claim 7, in which the engine is one of two engines supported on opposite sides of the fuselage by respective pylons.

* * * * *